Jan. 8, 1952      E. H. LEHMAN      2,581,543
FRICTION SHOCK ABSORBER FOR RAILWAY CAR TRUCKS
Filed June 25, 1948      2 SHEETS—SHEET 1
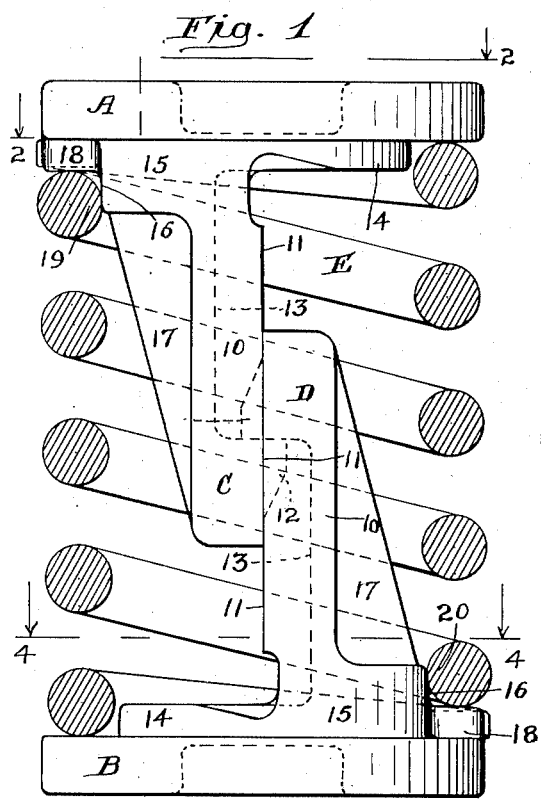
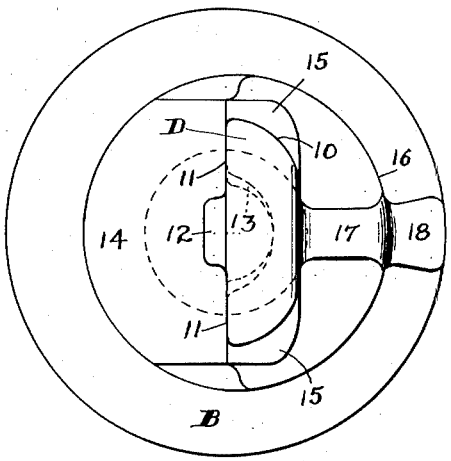
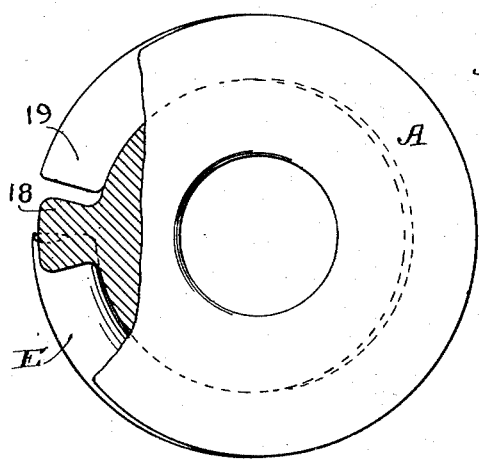
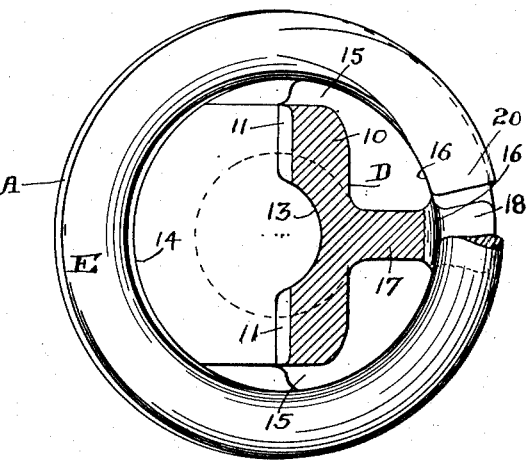
Inventor:
Edward H. Lehman.
By
Henry Fuchs.
Atty.

Jan. 8, 1952 E. H. LEHMAN 2,581,543
FRICTION SHOCK ABSORBER FOR RAILWAY CAR TRUCKS
Filed June 25, 1948 2 SHEETS—SHEET 2
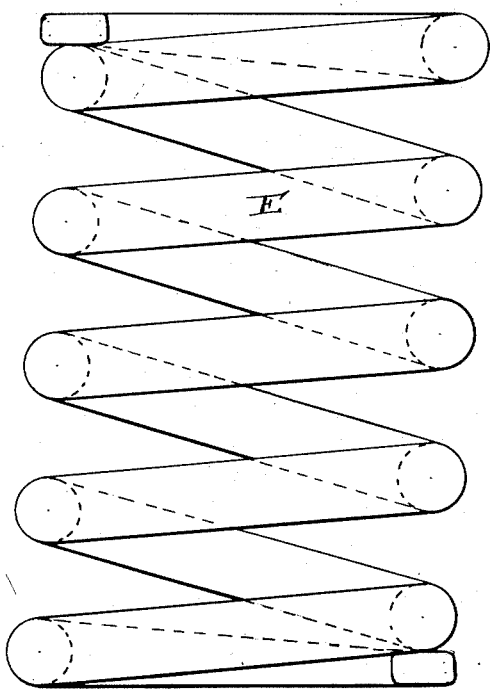
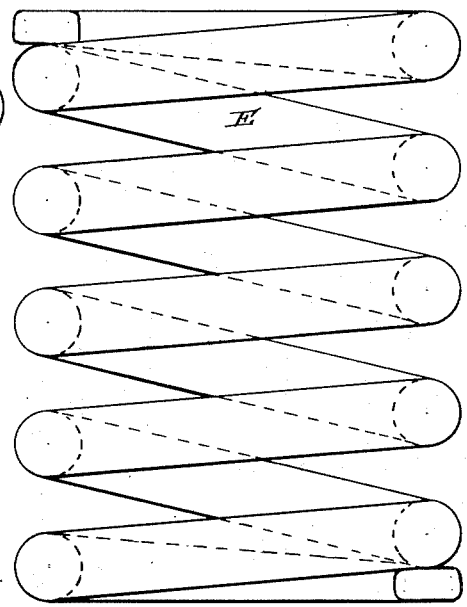
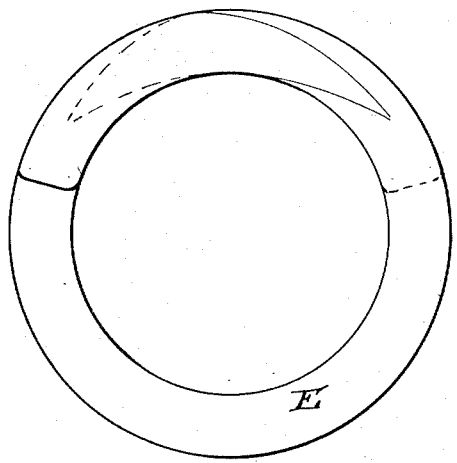
Inventor:
Edward H. Lehman.
By Henry Fucks.
Atty.

Patented Jan. 8, 1952

2,581,543

UNITED STATES PATENT OFFICE 2,581,543

FRICTION SHOCK ABSORBER FOR RAILWAY CAR TRUCKS

Edward H. Lehman, Chicago, Ill., assignor to W. H. Miner, Inc., Chicago, Ill., a corporation of Delaware Application June 25, 1948, Serial No. 35,204

4 Claims. (Cl. 267—9)

This invention relates to improvements in combined spring and friction shock absorbers, especially adapted for use in connection with railway car trucks for snubbing or dampening the action of the truck springs.

One object of the invention is to provide a shock absorber adapted to be substituted for one or more of the spring units of a cluster of truck springs of a railway car, comprising a pair of relatively slidable friction elements, and spring means opposing relative movement of said elements, wherein the spring means also presses the friction elements into frictional contact with each other.

A further object of the invention is to provide a shock absorber, as set forth in the preceding paragraph, wherein the spring means is in the form of a helical coil surrounding the friction elements and distorted to press laterally inwardly on the friction elements at respectively opposite sides of the mechanism to force the friction elements into tight frictional engagement with each other.

A more specific object of the invention is to provide a friction shock absorber, comprising top and bottom followers, top and bottom, substantially vertically disposed friction posts, projecting toward each other from said followers and having lengthwise sliding engagement with each other along their inner sides, and a helical coil spring surrounding said posts, bearing at its top and bottom ends on said followers, respectively, and being under canting tension, in the assembled condition of the mechanism, to exert pressure to force said posts laterally toward each other, the spring, in its normal condition, as manufactured and before assembly with the followers and friction posts, having, when stood on end, the axis thereof on which it is coiled, canted or inclined to the vertical to laterally offset one end of the spring with respect to the other, to place the same under canting tension when forcibly flexed from canted toward or slightly beyond righted position.

Other objects of the invention will more clearly appear from the description and claims hereinafter following.

In the accompanying drawings forming a part of this specification, Figure 1 is a side elevational view of my improved shock absorber, showing the spring in vertical transverse section. Figure 2 is a top plan view of Figure 1 with the top follower plate partly broken away and partly in horizontal section. Figure 3 is a top plan view of the bottom friction post and follower plate shown in Figure 1. Figure 4 is a horizontal sectional view, corresponding substantially to the line 4—4 of Figure 1. Figure 5 is an elevational view of the canted or inclined helical coil spring employed in my improved shock absorber. Figure 6 is an elevational view, similar to Figure 5, showing the spring in the righted and compressed condition it assumes when assembled with the other parts of my improved shock absorber. Figure 7 is a top plan view of Figure 6.

My improved shock absorber, as shown in the drawings, comprises broadly top and bottom follower plates A and B, vertically disposed friction posts C and D, extending from the follower plates A and B, respectively, and a helical coil spring E surrounding the posts and opposing relative approach of the follower plates.

The follower plates A and B are in the form of circular discs and have the posts C and D formed integral therewith, the post C depending from the top follower plate A and the post D upstanding from the bottom follower plate B. The top and bottom combined follower plate and post members are of identical design. Each of the posts C and D includes a vertically disposed, relatively heavy plate portion 10 having a lengthwise extending, flat friction surface 11 on its inner side engaging the surface 11 of the other post. At the outer end, each post has a laterally inwardly projecting lug 12 on the inner side thereof, engageable with the lug 12 of the other post to limit lengthwise separation of the posts. Rearwardly or inwardly of the lug 12, the inner side of each post is cut out or slotted lengthwise, as indicated at 13, to provide clearance for, and accommodate the lug 12 of the other post for lengthwise movement. Each post C and D has a cylindrical base portion 14 at the end thereof where it merges with the corresponding follower plate, the base portion 14 of each post being thickened at the side thereof remote from the friction surface of the post, as indicated at 15, thus providing an approximately semi-circular elevation presenting a vertically disposed curved abutment wall 16 on which the inner sides of the corresponding end coils of the spring E bear. The plate portion 10 of each post is preferably reenforced by a lengthwise extending web 17 formed on the outer side thereof and extending from the thickened portion 15 of the base 14 to the outer end of the plate portion 10 of the post. A stop lug 18 for the corresponding tang of the spring E is provided on each follower plate A and B in substantial alignment with the web 17. As clearly shown in Figure 1, each stop lug 18 is of lesser height than the thickened portion 15 of the base 14 of the corresponding post.

The friction surfaces 11—11 of the top and bottom posts C and D lie in vertical planes which are at right angles to the outer faces of the top and bottom follower plates A and B, respectively, the surface 11 of each post being slightly laterally inwardly offset with respect to the central vertical axis of the cylindrical base portion 14 of the corresponding post to compensate for wear of the friction surfaces of the device, as hereinafter pointed out.

The helical coil spring E surrounds the posts C and D, having its top and bottom ends bearing respectively on the follower plates A and B. The spring E, in the assembled condition of the mechanism, is under canting tension, that is, it is formed so that it forcibly tends to assume an inclined or leaning position toward the right, as seen in Figure 1, thereby forcibly pressing the inner side of the upper coil 19 at the left hand side of the mechanism against the abutment wall 16 of the base of the top post C, and the inner side of the lower coil 20 at the right hand side of the mechanism against the abutment wall 16 of the base of the bottom post D. The pressure thus exerted by the canting tension of the spring E forces the friction surfaces of the posts into tight engagement with each other. In the assembled condition of the mechanism, the spring E is preferably under initial compression.

As shown in Figure 5, the spring E, as manufactured, is of special design to produce the canting tension when assembled with the posts C and D, being coiled on an axis which is inclined with respect to the central vertical axis of its base, that is, coiled in such a manner that it leans to one side when stood on its base, and tends to assume this leaning or inclined position when forcibly righted by flexing the same toward upright position.

As illustrated in Figure 5, the spring E is coiled in such a manner when manufactured that it leans to the right when stood on its base. Thus, when the spring is forcibly flexed to the positions shown in Figures 6 and 1, it is placed under canting tension and its inherent resiliency tends to force the same to assume its leaning position, thereby exerting pressure toward the right on the top post C of the shock absorber and pressure toward the left on the bottom post D. As will be evident, the pressure exerted on the posts C and D is proportionate to the amount of inclination imparted to the spring in manufacturing the same, and the desired pressure to provide sufficient friction between the posts to produce the proper snubbing action may be had by inclining the axis about which the spring is coiled to a greater or lesser extent as found necessary. By the employment of the leaning spring, which is righted when assembled with the friction posts, all of the parts of the mechanism are held in upright position and proper alignment of the parts of the shock absorber is assured during all stages of the operation of the same.

As hereinbefore stated, the friction surfaces 11—11 of the posts are offset slightly with respect to the vertical central axis of the bases of said posts to compensate for wear. Thus, when the parts are assembled, the spring E is placed under additional canting tension in that it is flexed slightly beyond the position wherein its central longitudinal axis is truly vertical, thereby forcibly holding the posts in flat contact along the friction surfaces as wear occurs on the same.

In assembling the mechanism, the spring E is first placed over the post D in such a position that the tang at the lower end thereof is in back of the lug 18, as seen in Figure 1, and the tang at the upper end will be in back of the lug 18 of the top post C when the mechanism is completely assembled. The post C is then assembled with the other parts by inserting the friction plate 10 of the same downwardly within the coils of the spring, the posts C and D being held in tilted position away from each other so that the lugs 12—12 thereof will pass each other. The parts are then forced together until the lugs pass each other, whereupon the lug of the post C will snap under the lug of the post D, locking the posts together against lengthwise separation. At the same time, the spring E is forcibly flexed from its inclined position to the righted position shown in Figures 1 and 6 and the end coils brought into engagement with the abutment walls 16—16 of the base portions of the posts C and D. As will be evident, the lugs 18—18 prevent rotation of the spring E, thus maintaining it in proper position to force the posts together in lateral direction.

My improved shock absorber preferably replaces one or more of the spring units of a truck spring cluster, being interposed between the usual top and bottom spring plates which cooperate with said cluster.

The operation of the improved shock absorber is as follows: Upon the spring cluster of the truck of a railway car being compressed between the spring follower plates of the cluster, my improved shock absorbing unit, which is disposed between said follower plates, is compressed with the springs, thereby forcing the post C downwardly toward the post D against the resistance of the spring E. Due to the canting tension of the spring E, the parts are held in tight frictional contact during this relative movement of the same, thereby providing the desired frictional resistance between said posts, the coils at the lower end being forced laterally against the wall 16 at the right hand side of the base of the post D and the coils at the upper end thereof being forced laterally against the wall 16 at the left hand side of the base of the post C. Compression of the mechanism is positively limited by engagement of the outer end of each post with the base portion 14 of the other post.

Upon release of the mechanism, the posts C and D are restored to the normal position shown in Figure 1 by the expansive action of the spring E, longitudinal separation of the posts being limited by engagement of the lugs 12—12 of said posts with each other. As will be evident, the frictional resistance produced by my improved shock absorber is substantially constant throughout both compression and expansion of the device.

I claim:

1. In a friction shock absorbing mechanism, the combination with an upper friction post having a laterally outwardly facing abutment surface on the outer side thereof at one side of the mechanism; of a lower friction post having a laterally outwardly facing abutment surface at the outer side thereof at the opposite side of the mechanism, said posts having lengthwise sliding engagement with each other on their inner sides; and a helical coil spring canted in its free state before application to the mechanism, said coil spring being applied in surrounding relation with respect to said posts stressed toward the vertical with the inner sides of the coils at the top and bottom ends in bearing engagement respectively with said abutment surfaces of said upper and lower posts.

2. In a friction shock absorbing mechanism, the combination with an upper friction post having a laterally outwardly facing abutment surface on the outer side thereof at one side of the mechanism; of a lower friction post having a laterally outwardly facing abutment surface at the outer side thereof at the opposite side of the mechanism, said posts having lengthwise sliding engagement with each other on their inner sides; and a helical coil spring in its free unapplied state having its longitudinal central axis inclined with respect to the central vertical axis of its base, said coil spring being applied in surrounding relation with respect to said posts stressed to displace its central longitudinal axis toward the vertical with the inner sides of the coils at the top and bottom ends in bearing engagement respectively with said abutment surfaces of said upper and lower posts.

3. In a friction shock absorbing mechanism, the combination with an upper friction post having a laterally outwardly facing abutment surface on the outer side thereof at one side of the mechanism; of a lower friction post having a laterally outwardly facing abutment surface at the outer side thereof at the opposite side of the mechanism, said posts having lengthwise sliding engagement with each other on vertical friction surfaces; and a helical coil spring stressed to upright position from a leaning position in its unapplied free state, said spring surrounding said posts, said spring having the inner sides of the coils at the top and bottom ends in bearing engagement respectively with said abutment surfaces of said upper and lower posts.

4. In a friction shock absorbing mechanism, the combination with a top follower plate; of a bottom follower plate; a top friction post depending from said top plate; a bottom friction post upstanding from said bottom follower plate, said post having lengthwise sliding engagement with each other, said top post having a lateral abutment face at its base end at the outer side of the post, said bottom post having a lateral abutment face at its base end at the outer side of the post; and a coil spring stressed to upright position from a canted position in its unapplied free state, said spring enclosing said posts, and bearing at its top and bottom ends on said top and bottom follower plates, said spring having the inner sides of the top and bottom coils thereof bearing on said lateral abutment faces of said posts.

EDWARD H. LEHMAN.

REFERENCES CITED

The following references are of record in the file of this patent:

UNITED STATES PATENTS

| Number | Name | Date |
|---|---|---|
| 1,146,933 | Gallagher | July 20, 1915 |
| 1,255,214 | O'Connor | Feb. 5, 1918 |
| 1,499,319 | Whitehill | June 24, 1924 |
| 2,410,160 | Haseltine | Oct. 29, 1946 |
| 2,410,165 | Johnson et al. | Oct. 29, 1946 |